US012650352B2

(12) United States Patent　　　(10) Patent No.:　US 12,650,352 B2

Beugnot et al.　　　　　　　　　　(45) Date of Patent:　　　Jun. 9, 2026

(54) OPTICAL FIBER PRESSURE SENSOR USING THERMAL PRESSURE SENSING

(71) Applicants:CENTRE NATIONAL DE LA RECHERCHE SCIENTIFIQUE, Paris (FR); Université Marie et Louis Pasteur, Besançon (FR)

(72) Inventors: Jean-Charles Beugnot, Boulot (FR); Jacques Chretien, Champagney (FR); Adrien Godet, Pirey (FR); Kien Phan Huy, Besancon (FR); Jérôme Salvi, Bonnevent Velloreille (FR)

(73) Assignees: CENTRE NATIONAL DE LA RECHERCHE SCIENTIFIQUE, Paris (FR); UNIVERSITÉ MARIE ET LOUIS PASTEUR, Besançon (FR)

( * ) Notice: Subject to any disclaimer, the term of this patent is extended or adjusted under 35 U.S.C. 154(b) by 281 days.

(21) Appl. No.: 18/555,591

(22) PCT Filed: Apr. 19, 2022

(86) PCT No.: PCT/EP2022/060302

§ 371 (c)(1),
(2) Date: Oct. 16, 2023

(87) PCT Pub. No.: WO2022/223552

PCT Pub. Date: Oct. 27, 2022

(65) Prior Publication Data

US 2024/0133759 A1　　Apr. 25, 2024

(30) Foreign Application Priority Data

Apr. 21, 2021　(FR) ...................................... 2104180

(51) Int. Cl.
|  |  |
| --- | --- |
| *G01L 11/02* | (2006.01) |
| *G01L 11/00* | (2006.01) |
| *G01L 21/00* | (2006.01) |

(52) U.S. Cl.
CPC ........... *G01L 11/025* (2013.01); *G01L 11/002* (2013.01); *G01L 21/00* (2013.01)

(58) Field of Classification Search
CPC ....... G01L 11/025; G01L 11/002; G01L 21/00
(Continued)

(56) References Cited

U.S. PATENT DOCUMENTS

| 5,093,569 | A | * | 3/1992 | Krumboltz | ............. | G02B 6/264 |
| | | | | | | 250/231.19 |
| 6,823,738 | B1 | * | 11/2004 | Wlodarczyk | ........... | G01L 19/04 |
| | | | | | | 73/705 |

(Continued)

FOREIGN PATENT DOCUMENTS

| CN | 100406841 | C | * | 7/2008 |
| CN | 104237166 | A | * | 12/2014 |

(Continued)

OTHER PUBLICATIONS

J. Gouveia Ca, M. J and A.S. P (2013) Refractometric Optical Fiber Platforms for Label Free Sensing. Current Developments in Optical Fiber Technology. InTech. Available at: http://dx.doi.org/10.5772/ 55376. (Year: 2013).*

(Continued)

*Primary Examiner* — Peter J Macchiarolo
*Assistant Examiner* — Monica S Young
(74) *Attorney, Agent, or Firm* — Maier & Maier, PLLC

(57)　　　　　ABSTRACT

A pressure-measuring device including an optical fibre with a thinned portion, a laser, called the heating laser, arranged to emit an optical wave, called the heating wave, into the thinned portion, a measuring means including a sensor that (Continued)

is arranged to measure a backscattered optical wave that is generated by an optical wave, called the interrogation wave, and that originates in the thinned portion of the optical fibre, and a processing unit arranged and/or programmed to measure a pressure of a fluid, preferably a gas, encircling the thinned portion, on the basis of the measurement of the backscattered wave.

15 Claims, 2 Drawing Sheets

(58) Field of Classification Search
USPC .......................................................... 73/705
See application file for complete search history.

(56) References Cited

U.S. PATENT DOCUMENTS

| | | | | |
|---|---|---|---|---|
| 11,353,367 | B2 * | 6/2022 | Godfrey | G01D 5/35361 |
| 2005/0039544 | A1 * | 2/2005 | Jones | G01F 1/44 |
| | | | | 73/861 |
| 2006/0289386 | A1 * | 12/2006 | Tysoe | H01L 21/31111 |
| | | | | 73/705 |
| 2008/0085073 | A1 | 4/2008 | Jones | |
| 2008/0264182 | A1 * | 10/2008 | Jones | G01F 1/363 |
| | | | | 73/861.63 |
| 2008/0285908 | A1 * | 11/2008 | Ling | G01D 5/268 |
| | | | | 385/13 |
| 2015/0235805 | A1 * | 8/2015 | Gardiner | G01L 19/04 |
| | | | | 374/161 |
| 2015/0323558 | A1 * | 11/2015 | Cranch | G01L 1/00 |
| | | | | 356/28.5 |
| 2016/0216136 | A1 * | 7/2016 | Luvalle | G01L 11/025 |
| 2019/0310069 | A1 * | 10/2019 | Nasilowski | G01B 9/02015 |
| 2020/0249111 | A1 * | 8/2020 | Doyle | G01L 11/025 |

FOREIGN PATENT DOCUMENTS

| | | | | |
|---|---|---|---|---|
| WO | WO-2007058518 | A1 * | 5/2007 | |
| WO | WO-2013165428 | A1 * | 11/2013 | G01N 11/16 |

OTHER PUBLICATIONS

Ahsani, V., Ahmed, F., Jun, M. B. G., & Bradley, C. (2019). Tapered Fiber-Optic Mach-Zehnder Interferometer for Ultra-High Sensitivity Measurement of Refractive Index. Sensors, 19(7), 1652. https://doi.org/10.3390/s19071652 (Year: 2019).*

International Search Report and Written Opinion issued on Aug. 30, 2022, in corresponding International Application No. PCT/EP2022/060302, 24 pages.

Mcmillen Ben et al, "Fiber Bragg grating vacuum sensors", Applied Physics Letters, American Institute of Physics, 2 Huntington Quadrangle, Melville, NY 11747, vol. 87, No. 23, Nov. 28, 2005 (Nov. 28, 2005), p. 234101-234101, 3 pages.

Zhu Xiaoliang et al, "Tapered splice technique for capillary optical fiber", Optical Fiber Technology, vol. 36, Jan. 1, 2017 (Jan. 1, 2017), p. 130-133, 4 pages.

French Search Report issued on Mar. 14, 2022, in corresponding Application No. 2104180, 9 pages.

* cited by examiner

OPTICAL FIBER PRESSURE SENSOR USING THERMAL PRESSURE SENSING

TECHNICAL FIELD

The present invention relates to a pressure-measuring device. It also relates to a vacuum pressure measurement system equipped with such a device.

The field of the invention is that of pressure measurement, especially vacuum pressure measurement.

BACKGROUND

Devices for measuring pressure are known.

For example, according to the article "Fibre Bragg grating vacuum sensors", https://doi.org/10.1063/1.2140082, a sensor for measuring vacuum pressure is known, comprising an optical fibre whose core is surrounded by a metal part and into which a Bragg grating is inserted. This device comprises a first laser emitting an optical wave into the fibre core. In this device, the optical wave from the first laser passing through the optical fibre will cause a temperature rise in the part of the fibre surrounded by metal. The temperature rise in this part of the optical fibre will induce an index variation depending on the local temperature of the fibre. This device also uses a second laser emitting a second optical wave to interrogate the optical fibre. The wave emitted by the second laser will be sent into the optical fibre, and as it travels, this second wave undergoes a wavelength shift at each index variation encountered. Such a device also includes a Bragg grating positioned in the optical fibre to reflect part of the optical wave from the second laser at each variation in index of interest (that is that predicted by the Bragg grating). With this device, the study of the different wavelength shifts of the reflected waves from the second laser can be traced back to pressure measurements.

The Device is Functional, but Poses Different Problems, Especially in Terms of:

- compactness, since such a system requires the use of at least two lasers,
- simplicity and implementation, because the optical fibre used in the measurement is difficult to design due to the insertion of a Bragg grating into the optical fibre and the addition of a metal part around part of the fibre. As a result, such a device, especially the optical fibre used for measurement, requires numerous design steps, most of which are non-trivial to implement,
- cost, linked to the design and use of the Bragg grating and the metal part,
- accuracy, as this type of sensor is limited in accuracy.

In this way, such a device can trace back pressure information by measuring a variation in index. This state-of-the-art measurement device cannot be dissociated from the use of a Bragg grating, as the latter enables the index shift to be measured via the reflection of wavelength-shifted waves on the reflectors of the Bragg grating.

The purpose of the present invention is to provide a pressure-measuring device for solving at least one of the above-mentioned problems.

SUMMARY

The invention makes it possible to achieve at least one of the aforementioned aims by means of a pressure-measuring device comprising:

an optical fibre comprising a thinned part,
a laser, referred to as a heating laser, arranged to emit an optical wave, referred to as a heating wave, into the thinned part,
a measurement means comprising a sensor arranged to measure a backscattered optical wave from a so-called interrogation optical wave originating from the thinned part of the optical fibre, and
a processing unit arranged and/or programmed to measure a pressure of a fluid, preferably a gas, surrounding the thinned part from the measurement of the backscattered wave.

Thus, the device according to the invention uses an optical fibre having a thinned part. The device according to the invention thus uses an optical fibre arrangement that is simple to implement and does not require the addition of extra components, such as a Bragg grating and/or metal part in the optical fibre. The device is therefore simpler and easier to implement.

Costs associated with the components and design of the device are also reduced.

Furthermore, the device according to the invention can operate with a single laser that can be used both to excite the fibre and to interrogate it. This also improves compactness, simplicity and implementation of the device according to the invention.

The use of an optical fibre comprising a thinned part without the addition of extra elements in the core of the optical fibre promotes temperature increase in the optical fibre and in the environment external to the optical fibre by a design that is simple to implement and inexpensive. Combining an optical fibre with a thinned part with the arrangement of the device according to the invention promotes temperature increase in the optical fibre, especially in the thinned part, and in the environment external to the optical fibre with only a single heating wave path in the thinned part. Pressure measurement with the device according to the invention is therefore simpler to implement.

Pressure measurement according to the invention is based on the measurement of the backscattered wave coming from the thinned part, which carries the temperature variation information.

By "backscattered wave", it is meant a wave resulting from the phenomenon of light scattering, that is an optical wave that is deflected in several directions by interaction with elements in the medium in which it propagates. In particular, the backscattered wave corresponds to part of an incident wave that is reflected in the direction of the incident wave by interaction of the incident wave with the wave propagation medium, in this case the optical fibre. Thus, the backscattered wave for the purposes of the invention is induced by a phenomenon belonging to light scattering. Consequently, the backscattered wave for the purposes of the invention is to be distinguished from the case of a wave incident on a reflecting surface for which part of the beam is transmitted while another part is reflected. In this case, the incident wave interacts with an element added to the optical fibre and not with the "material" of the optical fibre, that is the core of the optical fibre.

The optical fibre may not comprise a Bragg grating and/or the thinned part of the optical fibre may not comprise a Bragg grating.

The thinned part of the optical fibre may not comprise a metal surface treatment, for example a metal coating on an external wall or on an external perimeter of the thinned part.

The optical fibre may not comprise a metal part surrounding the thinned part.

In this way, the optical fibre can consist of a non-thinned part and a thinned part.

In the device according to the invention, the increase in temperature in the optical fibre is preferably due solely to the propagation of the heating wave in the thinned part.

The heating wave can comprise a power of at least twice, preferably at least nine times, higher than the power of the interrogation wave.

In this way, the device according to the invention can use a heating wave comprising a high power. In this way, only the heating wave excites the optical fibre in view of a temperature rise.

Preferably, the sensor of the measurement means can comprise a spectrometer.

By "thinned part", it is meant:

a part with a smaller transverse cross-section than another part of the fibre known as "non-thinned", or preferably, a portion with a transverse cross-sectional area preferably at least four times smaller, or even preferably at least fifty times smaller, than the transverse cross-sectional area of another, so-called "non-thinned", fibre part.

Further, this thinned part may comprise a constant transverse cross-section over some length.

Preferably, the transverse cross-sectional area of the thinned part can be at least two times smaller than the non-thinned fibre part, preferably eight times smaller than the non-thinned part.

The thinned part may comprise a transverse cross-section of less than 50 micrometres, preferably less than or equal to 1 micrometre.

By transverse cross-section, it is preferably meant a diameter as commonly used in the language of optical fibres.

Such an arrangement makes it possible to obtain a transverse cross-section of the thinned part that is much smaller than the other parts of the optical fibre.

The thinned part can extend along a longitudinal direction of less than 150 millimetres, preferably greater than 20 millimetres and/or less than 120 millimetres.

This size makes it possible to obtain a thinned fibre part of a substantial size. The size of the thinned optical fibre makes it possible to improve thermal effects in the optical fibre, especially as the device according to the invention is arranged to cause a temperature increase in the thinned part with only one heating wave path in the thinned part, unlike some devices in the state of the art which may require:

several round trips of the wave serving to thermally excite the optical fibre, and/or the use of additional components such as at least one Bragg grating and/or a metal part and/or any other element added to the optical fibre to promote thermal excitation.

The heating laser may comprise an emission wavelength less than or equal to 1650 nanometres, preferably equal to 1555 nanometres±10 nanometres or 1550 nanometres±10 nanometres.

Consequently, the heating laser can be a laser emitting a wavelength in the visible range, for example between 400-780 nanometres or emitting in the infrared range, for example in the near infrared range between 780 nanometres and 1650 nanometres.

Using a heating laser emitting in the visible range increases backscattering phenomena in the thinned part. In particular, the backscattering phenomenon will be stronger, enabling a higher-intensity backscattered signal to be recorded. The signal-to-noise ratio of the processing unit is therefore improved.

Using a heating laser emitting between 1200 nanometres and 1400 nanometres enables more effective heating of the thinned part of the optical fibre due to water absorption peaks.

Advantageously, the measurement laser can emit an emission wavelength at 1550 or 1555 nanometres, that is in an emission wavelength commonly used in telecommunications. The measurement laser can therefore be a laser commonly used in telecommunications, which guarantees good quality-to-price ratio.

Preferably, the heating laser is continuous, that is designed to continuously emit its wave (heating wave).

Thus, the device according to the invention may not use a pulsed heating laser.

Using a continuous laser enables the optical fibre, especially the thinned part, to be heated more effectively, as there is no interruption in the heating wave flow.

In a first alternative, the device according to the invention can comprise a coupler arranged to divide the wave emitted by the heating laser into the heating wave and the interrogation wave, said coupler allowing passage of the heating wave and the interrogation wave to the optical fibre in a first direction and allowing passage of the backscattered wave from the thinned part to the measurement means in a second direction.

In this alternative, the heating wave and the interrogation wave come from the same wave emitted by one and a single laser, namely the heating laser. Consequently, a single laser can be used to heat the optical fibre, especially the thinned part, and to interrogate the optical fibre for performing pressure measurement.

The device according to the invention is therefore more compact and easier to implement, especially from the point of view of the space required for measurement.

Furthermore, it provides a fully fibred measurement device, making the device according to the invention safer, more easily transportable and scalable in the external environment.

The measurement means can comprise a laser, referred to as the measurement laser, arranged to emit an optical wave, called the measurement wave, into the optical fibre, acting as the interrogation wave.

Such a configuration makes it possible to provide a device comprising a laser for heating the thinned part of the optical fibre and a laser for interrogating the optical fibre to perform pressure measurement.

Furthermore, as two waves emitted by two separate lasers can be used to cause the temperature increase and the measurement of this temperature variation, it can be easier to dissociate the heating and measurement signal, in terms of signal processing, arrangement and control. For example, it may be easier to control power of the heating wave and the measurement wave.

The measurement laser can preferably be continuous or pulsed.

If the measurement laser emits a continuous measurement wave, the device according to the invention can follow the pressure variation over time.

The device according to the invention may not use a measurement laser emitting sub-millisecond pulses. Thus, if the measurement laser is pulsed, it can be arranged to emit pulses greater than or equal to one millisecond.

Using a pulsed measurement wave can enable faster pressure measurement. For example, in this way, the device according to the invention can give one or more pieces of pressure information in a punctual manner, using one or more pulses. In this way, the pressure measurement can be triggered by sending the measurement wave into the optical fibre, for example at a precise instant.

In an alternative, the measurement laser may comprise elements for emitting long pulses, that is greater than or equal to one millisecond. For example, the measurement laser may comprise a pulsed laser diode.

Furthermore, the measurement laser may comprise at least one element for forming long pulses. In this way, the measurement laser can initially emit a continuous measurement wave which is then shaped by the at least one element to become a pulsed wave. The at least one element for pulse shaping may comprise:

an optical chopper, and/or
an optical deflector designed to cut off the measurement wave in a first state and allow the measurement wave to pass therethrough in a second state, and/or
an optical modulator, for example an Acousto-Optic Modulator (AOM) operating in pulsed mode, preferably coupled with a driver.

The measurement wave can be sent into the optical fibre offset in time from the heating wave. In this way, the measurement wave can be sent into the optical fibre at a precise instant to perform the pressure measurement.

The heating laser and/or the measurement laser can each be arranged to emit the heating wave and/or the interrogation wave along a direction of elongation of the optical fibre. In particular, the heating and/or measurement wave can be arranged to propagate in the optical fibre, preferably in the core of the optical fibre, along its direction of elongation.

The heating and/or measurement laser can preferably be continuous and single-frequency.

Preferably, the measurement wave may comprise a wavelength shift with respect to the heating wave less than or equal to 10 nanometres.

In this way, the measurement laser can comprise an emission wavelength different from the emission wavelength of the heating laser. This may make it easier to distinguish between the measurement wave and the heating wave, and thus improve the control thereof.

In alternatives, the device according to the invention may comprise at least one optical modulator arranged to perform wavelength shift of the optical wave output from the optical modulator.

Preferably, the optical modulator can comprise an Acousto Optical Modulator (AOM) preferably coupled with a driver. The AOM can preferably operate in continuous mode. The AOM can be arranged to wavelength-shift an optical wave output from the AOM.

Such an arrangement can help to better distinguish the heating wave from the interrogation and/or measurement wave. In this way, backscattered wave processing can be facilitated. Furthermore, the AOM makes it possible to better adjust the wavelength offset of the heating wave with respect to the interrogation and/or measurement wave.

The AOM can be arranged to achieve a wavelength shift of less than or equal to 10 nanometres. This wavelength shift can be positive or negative. In this way, the absolute value of the wavelength shift can be less than or equal to 10 nanometres.

In a second alternative, the device according to the invention can comprise a circulator allowing, in a first direction, passage of the heating wave from the heating laser and passage of the measurement wave from the measurement laser into the optical fibre, and allowing, in a second direction, passage of the backscattered wave from the thinned part to the measurement means.

Thus, in this configuration, the heating wave and the measurement wave can each be emitted by a separate laser. According to this configuration, the wave emitted by the heating laser no longer needs to be divided.

The arrangement of the heating and measurement laser is therefore simple and very easy to implement. Furthermore, it provides a fully fibred measurement device, making the device according to the invention safer and more easily transportable and scalable in the external environment.

By way of non-limiting example, an AOM coupled with a driver can be positioned upstream or downstream of the coupler or circulator.

The sensor of the measurement means may comprise a reflectometer.

The backscattered wave may comprise a Rayleigh, Raman or Brillouin wave.

The processing unit may be arranged and/or programmed to determine a temperature variation of the optical fibre, in particular of the thinned part of the optical fibre, from the measurement of the backscattered wave.

By way of example, if the measurement wave is a pulsed wave, the pulses can be adjusted to measure small temperature variations. This improves accuracy of the device according to the invention.

The processing unit may comprise a Brillouin effect, and/or a Raman effect, and/or a Rayleigh effect thermometer arranged to measure a pressure from:

a temperature variation of the optical fibre, preferably of the thinned part of the optical fibre, and
a table relating the temperature variation to the pressure measurement.

This table may be known or determined empirically.

Preferably, the backscattered wave is a Brillouin wave. The processing unit can be arranged to measure a propagation velocity of the backscattered wave on the basis of a small wavelength shift of the backscattered wave relative to the interrogation wave or measurement wave from which the backscattered wave originates.

The small wavelength shift may be caused by the Doppler effect.

The Brillouin effect thermometer can be arranged to measure the temperature variation $\Delta T$ via the following formula:

$$\frac{1}{F_L}\frac{\Delta F_L}{\Delta T} = 9.2*10^{-5}/^\circ C. \qquad \text{[Math 1]}$$

With $F_L$ corresponding to the optical flow of the backscattered wave and $\Delta F_L$ corresponding to the variation in the optical flow of the backscattered wave.

The Raman-type backscattered wave may comprise a backscattered anti-Stokes wave.

Thus, in another alternative, the backscattered wave may be a Raman wave. The processing unit can be arranged to measure an intensity variation of the backscattered anti-Stokes wave with respect to the interrogation wave or measurement wave from which the backscattered wave originates.

The Raman effect thermometer can be arranged to measure the temperature variation via the following formula:

$$R(T) = \left(\frac{K_{as}}{K_s}\right)\left(\frac{\lambda_s}{\lambda_{as}}\right)^4 \exp\left(-\frac{h.v_R.c/k_B}{T}\right) \qquad \text{[Math 2]}$$

7

8

With R(T) corresponding to a ratio between the flow intensities of the Raman Stockes and Raman anti-Stockes of the backscattered wave. The R(T) ratio can be in the order of 0.74% at a temperature of 300 Kelvin (K), $\lambda_{as}$, $\lambda_2$ corresponding to the anti-Stokes ($\lambda_{as}$) and Stokes ($\lambda_s$) resonance wavelengths respectively, $K_{as}$, $K_s$ corresponding to the effective transverse cross-sections of the anti-Stokes and Stokes bands respectively, $v_R$ corresponds to the Silica resonance, $v_R$=440 cm$^{-1}$, T the temperature in Kelvin, h Planck's constant, c the speed of light in vacuum, and kB corresponds to Boltzmann's constant.

In another alternative, the scattered wave can be a Rayleigh wave. The measurement unit can be arranged to measure a variation in the optical losses of the backscattered wave as it propagates through the thinned part.

The Rayleigh effect thermometer can be arranged to measure the temperature variation using the following formula:

$$\frac{\Delta \lambda}{\lambda} = \frac{\Delta v}{v} = K_T.\Delta T \qquad \text{[Math 3]}$$

Where for a lightly germanium-doped Silica fibre, $K_T$=6.45*10–6C$^{-1}$, $\lambda$ corresponding to the backscattered wavelength and $\Delta\lambda$ to its wavelength offset in the optical fibre, $v$ corresponding to the frequency of the backscattered wave and $\Delta v$ its frequency offset in the optical fibre.

The processing unit can be arranged to measure a vacuum pressure of less than or equal to 0.9 bar, preferably less than or equal to 10$^{-9}$ bar.

The device may comprise at least one further optical fibre comprising a thinned part, at least one further optical fibre being connected in series to a free end of the optical fibre.

By free end, it is meant an optical fibre end that is not connected to any physical element.

Preferably, the device can comprise a plurality of optical fibres connected to each other in series, each optical fibre comprising a thinned part.

The plurality of optical fibres can be connected by optical fibre welding or by using mechanical connection means. The mechanical connection means may comprise an optical fibre connector.

The sensor of the measurement means can be arranged to measure a plurality of backscattered waves from each thinned part of optical fibre and the processing unit being arranged and/or programmed to measure a pressure of a fluid surrounding each thinned part from the measurement of the backscattered waves.

In this way, the measurement device can be a so-called "quasi-distributed" or "quasi-dispatched" measurement device.

The optical fibres may be similar or different. For example, they may have different transverse cross-sections of thinned part or different lengths of thinned part.

According to another aspect of the invention, a vacuum pressure measurement system is provided comprising a gauge placed in an enclosure in which a fluid circulates, said gauge comprising a sensor part including a device according to the invention.

BRIEF DESCRIPTION OF THE DRAWINGS

Further advantages and features of the invention will become apparent upon reading the detailed description of non-limiting implementations and embodiments, and the following appended drawings.

DETAILED DESCRIPTION

Of course, the embodiments described below are by no means limitative. In particular, it is possible to envisage alternatives to the invention comprising only a selection of the characteristics described hereinafter in isolation from the other characteristics described, if this selection of characteristics is sufficient to confer a technical advantage or to differentiate the invention from prior art. This selection includes at least one preferably functional characteristic without structural details, or with only part of the structural details if this part alone is sufficient to confer a technical advantage or to differentiate the invention from prior art.

In particular, all the alternatives and embodiments described can be combined with one another, provided there is nothing technically opposed to such a combination.

In the figures, elements common to several figures retain the same reference.

Figure 1:
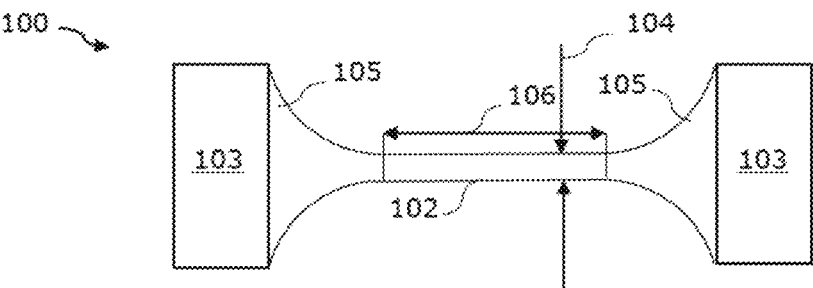
FIG. 1 is a schematic representation of a non-limiting exemplary embodiment of an optical fibre arrangement used in a device according to the invention.

FIG. 1 is a schematic representation of an example of an arrangement of an optical fibre 100 used in a device according to the invention.

The optical fibre 100 comprises a thinned part 102, a non-thinned part 103 and an intermediate zone 105. The non-thinned part 103 surrounds the thinned part 102 of the fibre. The intermediate zone 105 corresponds to the zone connecting the non-thinned part 103 of the fibre 100 to the thinned part 102.

In particular, the thinned part 102 has a transverse cross-section 104 of less than 50 micrometres (μm). Preferably, the transverse cross-section 104 of the thinned part 102 is less than 1 μm, for example 0.5 μm.

The thinned part 102 extends along a longitudinal direction 106 of less than 150 millimetres (mm), preferably greater than 20 mm and/or less than 120 mm.

The transverse cross-section 104 of the thinned part 102 is constant along the size of the longitudinal direction 106 of the thinned part 102.

The size of the longitudinal direction 106 is chosen to promote heat transfer in the thinned part 102 of the optical fibre 100. In the case illustrated in FIG. 1, the thinned part comprises a constant transverse cross-section 104 over 100 mm.

By way of non-limiting example, the optical fibre 100 is a standard optical fibre, for example a SMF28 type standard optical fibre.

The optical fibre 100 is made of silica. Preferably, the 100 optical fibre is bare, that is it does not include a protective coating.

The non-thinned part 103 comprises a transverse cross-section of 125 μm. By way of non-limiting example, the non-thinned part 103 comprises a core with a diameter of 10 μm, and a layer surrounding the core referred to as "cladding" with a diameter of 125 μm. The thinned part 102 does not include a coating.

The thinned part 102 of optical fibre 100 does not include a Bragg grating. The optical fibre 100 does not include a Bragg grating.

The thinned part 102 of the optical fibre 100 does not include any metal surface treatment, such as a metal coating. In particular, the external perimeter of the thinned part 102 is devoid of any metal treatment or metal layer surrounding the thinned part 102.

Figure 2:
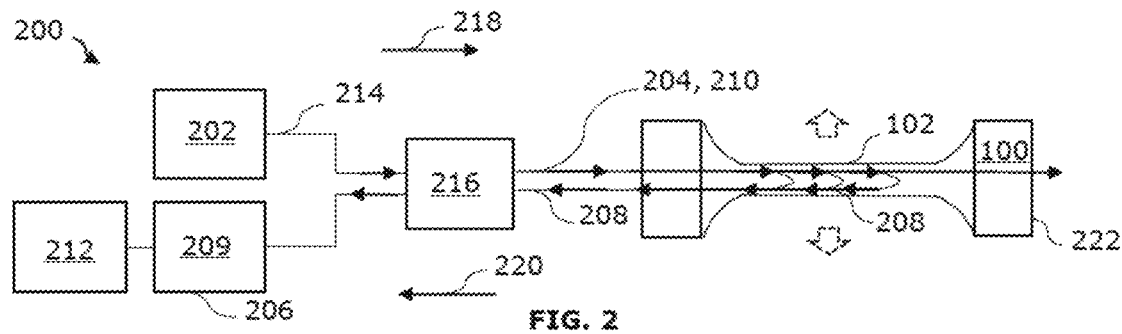
FIG. 2 is a first schematic representation of an exemplary embodiment of a first device according to the invention comprising an optical fibre as described in FIG. 1.

FIG. 2 is a first schematic representation of an exemplary embodiment of a device 200 according to the invention comprising an optical fibre 100 as described in FIG. 1.

The device 200 is a device for pressure measurement and comprises the optical fibre 100. The device 200 also comprises a laser 202, referred to as the heating laser 202, arranged to emit in the optical fibre 100, an optical wave 204, referred to as the heating wave 204, in the thinned part 102. The heating wave 204 propagates in the optical fibre 100, that is along the longitudinal direction 106 of the thinned part 102. The heating wave 204 is arranged to propagate in the optical fibre 100 along a single direction 218, hereinafter referred to as the first direction 218. Consequently, the heating wave 204 only travels one way in the optical fibre 100. No laser cavity is required for performing measurement along the device 200. The thinned part of the fibre extends, for example, over 100 mm. The size of the thinned part is chosen to improve heat transfer in the thinned part 102 of the optical fibre 100. The larger the thinned part 102, the greater the heat transfer. This is all the more advantageous as the heating wave 204 propagates only in the first direction 218 in the optical fibre 100.

The Device 200 Also Comprises:

- a measurement means 206 comprising a sensor 209 arranged to measure a backscattered optical wave 208 originating from an optical wave 210, referred to as the interrogation wave 210 and coming from the thinned part, and
- a processing unit 212 arranged and/or programmed to measure a pressure of a fluid (preferably a gas or a mixture of gases), here a gas such as air, surrounding the thinned part 102 from the measurement of the backscattered wave 208.

The processing unit comprises at least one computer, a central processing or calculator unit, an analog electronic circuit (preferably dedicated), a digital electronic circuit (preferably dedicated), and/or a microprocessor (preferably dedicated), and/or software means.

The measurement and processing of all the backscattered waves 208 emanating from the thinned part 102 of the fibre 100 enable the pressure measurement to be traced back.

The heating laser 202 is continuous and single-frequency. Using a continuous laser makes it possible to improve thermal effects in the optical fibre 100, especially in the thinned part 102, as the flow of the heating wave 204 is not interrupted. By way of non-limiting example, the heating laser 202 emits an optical wave at 1550 nm. The heating laser 202 is therefore a laser commonly used in telecommunications, which gives it a good quality-to-price ratio.

In the device illustrated in FIG. 2, the heating wave 204 and the interrogation wave 210 are derived from the same optical wave 214 emitted by the heating laser 202. The device is therefore very compact, using a single laser to thermally excite and interrogate the optical fibre 100.

The device 200 comprises a coupler 216 positioned upstream of the optical fibre 100 and downstream of the heating laser 202. The coupler 216 is arranged to divide the wave 214 emitted by the heating laser 202 into the heating wave 204 and the interrogation wave 210. In particular, the coupler 216 allows:

- passage of the heating wave 204 and the interrogation wave 210 towards the optical fibre 100 in the first direction 218, and
- passage of the backscattered wave 208 from the thinned part 102 to the measurement means 208 in a second direction 220, which is opposite to the first direction 218.

Thus, only the backscattered wave returns in the direction of the heating laser. The backscattered wave is conveyed via the coupler to the measurement means 206. The optical fibre 100 has a free end 222, opposite to an end connected to coupler 216. The heating wave 204 propagates in the optical fibre 100 and exits the optical fibre 100 at the free end 222 of the optical fibre 100.

The heating wave 204 comprises a power at least twice, preferably at least nine times, greater than the power of the interrogation wave 210. By way of a non-limiting example, the coupler 216 is arranged to distribute power of the wave 214 emitted by the heating laser 202, for example by distributing 90% of the power of the wave 214 emitted from the heating laser 202 to the heating wave 204 and 10% of the power of the wave 214 emitted from the heating laser 202 to the interrogation wave 210. In this way, only the heating wave 2004 can cause a temperature variation in the optical fibre 100, especially in the thinned part 102 of the optical fibre 100. The interrogation wave 210 does not thermally excite the thinned part 102 of the fibre 100. Thus, interrogation wave 210 can probe temperature without disturbing the thinned part 102 of the optical fibre 100.

By way of non-limiting example, the heating laser 202 used is a continuous laser emitting a light wave of the order of 100 mW in the wavelength band between 1500 nm and 1600 nm.

The backscattered wave 208 may contain a Brillouin-type, Raman-type or Rayleigh-type backscattering component.

The processing unit 212 can be arranged to trace back the pressure measurement via a determination of a temperature variation related to the backscattered wave 208.

The pressure measurement can then be determined using a table relating temperature to pressure.

The sensor 209 of the measurement means 206 of the device 200 preferably comprises a spectrometer. The spectrometer receives the backscattered wave 208 for analysis. The spectrometer is an optical reflectometer, also known as an Optical Time Domain Reflectometer (OTDR).

Preferably, the device 200 is arranged to measure a Brillouin-type backscattered wave 208. The processing unit 212 may comprise a Brillouin effect thermometer arranged to measure pressure from a temperature variation and a table relating the temperature variation to the pressure measurement.

In this case, the processing unit 212 is arranged to measure a propagation velocity of backscattered wave 208 on the basis of a small shift in length of backscattered wave 208 relative to interrogation wave 210. The small wavelength shift is caused by the Doppler effect. The temperature variation can then be determined using the mathematical relationship Math 1. A frequency (or wavelength) of the optical flow of the backscattered wave, noted $F_L$, can depend linearly on the temperature of the optical fibre 100 via a local variation of an acoustic velocity.

In another alternative, the device 200 is arranged to measure a Raman-type backscattered wave 208. The Raman-type backscattered wave 208 comprises an Anti-Stokes wave. In this case, the processing unit 206 can be arranged to measure an intensity variation of the backscattered Anti-Stokes wave 208 with respect to the interrogation wave 210 from which the backscattered wave originates. In this case, processing unit 212 may comprise a Raman effect thermometer. The temperature variation can be traced back using the formula Math 2.

In another alternative, device 200 is arranged to measure a Rayleigh-type backscattered wave 208.

The processing unit 212, via the reflectometer, is arranged to measure a variation in the optical losses of the backscattered wave 208 as it propagates through the thinned part 102. Optical losses are measured in decibels (dB). In this case, processing unit 212 may comprise a Rayleigh effect thermometer. The processing unit 212 can retrieve a temperature shift using the formula Math 3. By way of non-limiting example, when the backscattered wave 208 has a center wavelength of 1550 nm, the temperature shift can be equal to $\Delta T=(-0.801°$ C./GHz$)\Delta v$.

In an alternative, the processing unit 212 preferably comprises all three types of thermometer (Brillouin effect, Raman effect, and Rayleigh effect).

Preferably, the device 200 is fully fibred, which facilitates pressure measurements as it is more easily scalable and more secure. Furthermore, this makes it more easily integratable into a measurement system or into any measurement casing arranged to perform pressure measurement.

In the device 200, the heating wave 204 propagates in the optical fibre 100. Part of the heating wave 204 is absorbed by the material of the optical fibre 100, which causes, due to the convection phenomenon, an increase in temperature in the fibre 100, especially in the thinned part 102 of the optical fibre 100, and in the environment external to the optical fibre 100. In the case of the device 200, the heating wave 204 not absorbed in thinned part 102 is transmitted, propagates in the optical fibre 100 and continues its propagation after optical fibre 100. Only the interrogation wave 210 is backscattered in the thinned part 102 of the optical fibre 100. The backscattered wave 208 comes from backscattering of the interrogation wave 210 by glass impurities (i.e. silica) in the thinned part 102. The backscattered wave 208 carries information about the temperature variation integrated along the thinned part 102 of the optical fibre 100.

Thus, in the device 200, the heating wave 204 is used to thermally activate the thinned part 102 of the optical fibre 100. The backscattered wave 208 is in turn processed (i.e. analysed) to measure the temperature variation by spectroscopy. The arrangement of the optical fibre 100 promotes temperature increase in the thinned part 102 of the optical fibre 100 and in the environment external to the fibre. Such an arrangement of the optical fibre 100 is simple to implement and inexpensive. The optical fibre 100 is preferably bare, that is it has no coating. Then, pressure measurement using the device 200 does not require introduction of at least one Bragg grating into the thinned part 102 of the optical fibre 100 or into the optical fibre 100. Furthermore, no metal treatment or metal part or other element is required around the thinned part 102 of the optical fibre 100 or around the optical fibre 100. Only the interaction of the heating wave 204 in the thinned part 102 of the fibre 100 causes thermal effects such as an increase in temperature in the thinned part 102. The dimensions, that is transverse cross-section and/or size (i.e. length), of the thinned part are chosen to improve thermal excitation of the thinned part 102 by the heating wave 204.

By way of non-limiting example, the temperature variation can be measured by device 200 with a sensitivity in the order of one degree (° C.), for example 1° C.

The processing unit is arranged to measure a vacuum pressure of less than or equal to 0.9 bar, preferably less than or equal to $10^{-9}$ bar.

The device 200 is a point sensor, performing a point measurement along the optical fibre 100.

Figure 3:
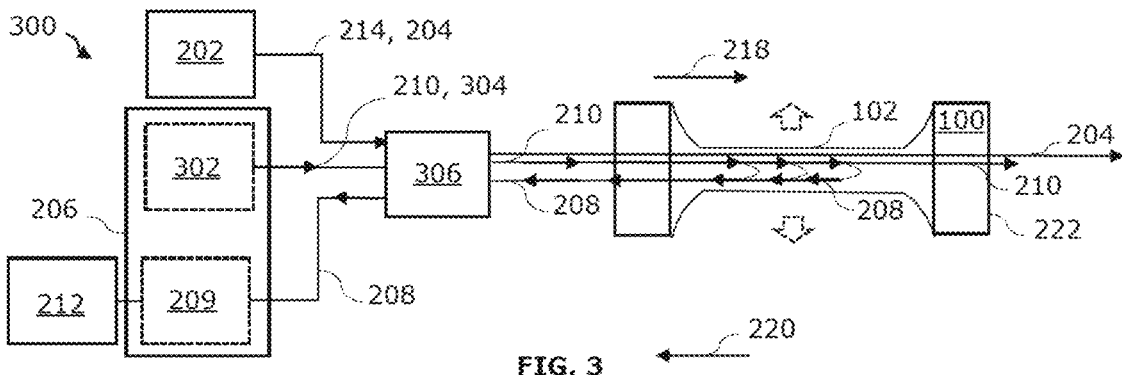
FIG. 3 is a schematic representation of a non-limiting exemplary embodiment of a second device according to the invention comprising an optical fibre as described in FIG. 1.

FIG. 3 is a second schematic representation of an exemplary embodiment of a device 300 according to the invention comprising an optical fibre 100 as described in FIG. 1. Only differences from the device 200 illustrated in FIG. 2 will be described.

The measurement means 206 of the device 300 comprises, in addition to the sensor 209, a laser 302, referred to as the measurement laser 302, arranged to emit an optical wave 304, referred to as the measurement wave 304, into the optical fibre 100. In the device 300, the measurement wave 304 is the same as the interrogation wave 210. The measurement wave 304 is used to interrogate the optical fibre 100. The measurement laser 302 and the sensor 209 may be two distinct or separate elements (i.e., each included in a separate casing) or included in the same element (i.e., included in the same casing).

The heating laser 204 illustrated in FIG. 3 is similar to that illustrated in FIG. 2. The measurement laser 302 emits a continuous, single-frequency measurement wave 304. Using a continuous measurement wave for the measurement wave 304 enables the optical fibre 100 to be continuously probed. The measurement wave 304 is offset in wavelength from the heating wave 204. The wavelength shift is less than or equal to 10 nanometres (nm), for example 5 nanometres. The emission wavelength of the measurement laser may therefore be 1555 nm. The wavelength offset between the heating wave 204 and the measurement wave 304 makes it easier to distinguish these two waves during the measurements and manipulations required prior to measurement, such as adjustments.

By way of non-limiting example, the measurement laser 302 is an external cavity laser emitting a continuous electromagnetic wave with a power of 100 mW at a wavelength of 1550 nm.

In an alternative arrangement 300, the measurement laser 302 can be arranged to emit at least one pulsed measurement wave 304. By way of non-limiting example, the measurement laser 302 may comprise at least one element, for example an optical chopper, to emit at least one pulse from a continuous wave. The pulsed measurement wave 304 is preferably longer than one millisecond (ms), for example it may be 4 ms.

The device illustrated in FIG. 3 includes a circulator 306.

The circulator 306 allows, in the first direction 218, passage of the heating wave 204 from the heating laser 204 and passage of the measurement wave 304 from the measurement laser 302 in the optical fibre 100. In the second direction 220, the circulator 306 allows passage of the backscattered wave 208 from thinned part 102 to the measurement means 206.

The backscattered wave 208 thus comes from backscattering of the measurement wave 304 by structural defects in the thinned part 102. The heating wave 204 emitted by the heating laser 202 therefore serves only to raise the temperature in the thinned part 102 of the optical fibre 100. As in the device 200, the heating wave propagates only once in the optical fibre 100.

The sensor 209 of the measurement device 206 comprises a reflectometer, for example a LUNA brand ODTR.

The measurement accuracy of the device 300 is equivalent to the measurement accuracy of the device 200.

Thus, in the device 300, the heating wave 204 of the heating laser 202 is used to heat the optical fibre 100, especially the thinned part 102 of the optical fibre 100. Temperature measurement is obtained by reflectometry via the sensor reflectometer 209 of the measurement means 206.

The device 300 can achieve the same measurement performance as the device 200 illustrated in FIG. 2. However, using one laser to thermally excite the fibre 100 and another laser to interrogate the fibre 100 makes it easier to process the pressure measurement, especially to more easily dissociate the heating wave 204 from the interrogation wave 210. Furthermore, it facilitates the control thereof, such as adjustments required for use of the device 300.

Figure 4:
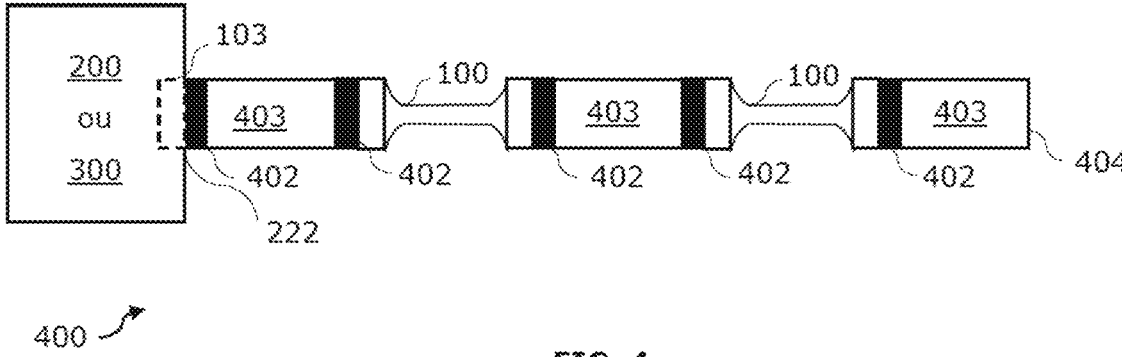
FIG. 4 is a schematic representation of a non-limiting exemplary embodiment of a third device according to the invention comprising a plurality of optical fibres as described in FIG. 1 and connected to each other in series.

FIG. 4 is a schematic representation of a non-limiting exemplary embodiment of a third device 400 according to the invention. The device 400 comprises:

the device 200 or 300, and a plurality of optical fibres 100, as illustrated in FIG. 1, and connected to each other in series from the optical fibre 100 of the device 200 or 300, especially from a free (that is unconnected) end 222 of the non-thinned part 103 of the optical fibre 100 of the device 200 or 300.

By way of non-limiting example, two optical fibres 100 are connected to the device 200 or 300. Of course, this figure can be higher or lower by connecting only one optical fibre 100 to the device 200 or 300. The optical fibres 100 of the device 400 are connected to each other by an optical fibre solder 402 or by a mechanical connection means 402, for example using an optical fibre connector. A standard optical fibre 403 is connected to each non-thinned part 103 of the optical fibre 100 via the weld 402 or mechanical connection means 402. The standard optical fibre 403 is, for example, of the SMF 28 type. Preferably, the standard optical fibre 403 is similar to the non-thinned part 103 of the optical fibre 100.

The sensor 209 of the measurement means 206 is arranged to measure a plurality of backscattered waves 208 originating from the optical wave 210 propagating in each thinned part 102 of all the optical fibres 100. The processing unit 212 of the device 400 is thus arranged and/or programmed to measure the pressure of the fluid surrounding each thinned part 102 from the measurement of the different backscattered waves 208. The succession of optical fibres 100 connected to each other in series includes a free end 404 to which no physical element is connected. The heating wave 204 and the interrogation wave 210 or the measurement wave 304 (if using device 300) exit through the free end 404.

In the device 400, the optical fibres 100 are identical. Of course, in one alternative device 400, it may have different optical fibres 100, for example optical fibres 100 comprising different thinned part transverse cross-section 102 and/or thinned part length 102.

Figure 5:
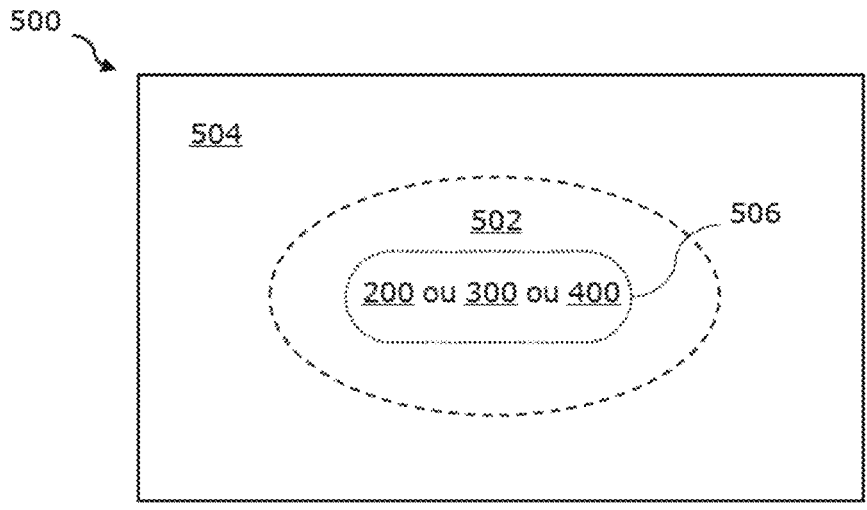
FIG. 5 is a schematic representation of a measurement system according to the invention comprising a device according to the invention as described in FIG. 2 or FIG. 3 or FIG. 4.

FIG. 5 is a schematic representation of a measurement system 500 according to the invention comprising a device 200, 300, 400 according to the invention as described in FIG. 2 or FIG. 3 or FIG. 4.

The vacuum pressure measurement system 500 comprises a gauge 502. The gauge 502 is placed in an enclosure 504 in which a gas circulates. The gas comprises air. The gauge 502 includes a sensor part 506 comprising a device 200 or a device 300 as described in FIG. 2 or FIG. 3.

The vacuum pressure is deduced from the amount of heat transferred by the fibre to the gas contained in the enclosure. The backscattered wave 208 carries this information.

The vacuum pressure measurement system 500 can achieve measurement ranges for primary and secondary vacuum with a resolution and repeatability at least equivalent, preferably superior, to Pirani gauge-based measurement systems using a heated filament placed in an enclosure whose pressure is to be measured.

As the sensor part 506 of the measurement system 500 is fibred, especially the measurement part comprised of the optical fibre 100 with the thinned part 102, the system 500 benefits from advantages of the intrinsic properties of optical fibres such as insensitivity to electromagnetic, radio, nuclear waves, etc. Furthermore, the system 500 can be a distributed measurement system 500 in that it can perform measurements over large detection zones by assembling in series several optical fibres 100 with a thinned part 102 along this detection zone, for example by comprising a device 400 described in FIG. 4. The detection zone can be, by way of non-limiting example, in the order of one kilometre or ten kilometres or a hundred kilometres or more.

Of course, the invention is not limited to the examples just described. Numerous modifications can be made to these examples without departing from the scope of the invention as described.

The invention claimed is:

1. A device for measuring pressure comprising:

an optical fiber comprising a thinned part formed by a reduced transverse cross-sectional area of the optical fiber which functions to transfer heat from the reduced transverse cross-sectional area to a surrounding fluid, a first laser configured to emit an optical wave into the thinned part in order to cause an increase in temperature in the thinned part of the optical fiber, a sensor configured to measure a backscattered optical wave coming from a fluid surrounding the thinned part of the optical fiber, and a processing unit configured to trace back a pressure measurement via a determination of a temperature variation related to the backscattered optical wave.

2. The device according to claim 1, wherein the optical fiber does not comprise a Bragg grating and/or wherein the thinned part of the optical fiber does not comprise a metal surface treatment.

3. The device according to claim 1, wherein the sensor comprises a spectrometer.

4. The device according to claim 1, wherein the thinned part comprises a transverse cross-section of less than 50 micrometers, and the thinned part extends along a longitudinal direction of less than 150 millimeters.

5. The device according to claim 1, wherein the first laser has an emission wavelength less than or equal to 1650 nanometers.

6. The device according to claim 1, further comprising:

a coupler configured to:

divide the wave emitted by the first laser into a heating wave and an interrogation wave, allow passage of the heating wave and the interrogation wave to the optical fiber in a first direction, and allow passage of the backscattered wave from the thinned part to the sensor in a second direction.

7. The device according to claim 6, wherein the heating wave comprises a power of at least twice the power of the interrogation wave.

8. The device according to claim 1, wherein the sensor comprises:

a second laser configured to emit a second optical wave, into the optical fiber, the second optical wave having a wavelength shift relative to the optical wave less than or equal to 10 nanometers.

9. The device according to claim 8, further comprising:

a circulator configured to:

allow, in a first direction, passage of the heating wave from the laser and passage of the measurement wave from the second laser into the optical fiber, and allow, in a second direction, passage of the backscattered wave from the thinned part to the sensor.

10. The device according to claim 8, wherein the sensor comprises a reflectometer.

11. The device according to claim 1, wherein the backscattered wave comprises a Rayleigh wave or a Raman wave or a Brillouin wave.

12. The device according to claim 1, wherein the processing unit is configured to deduce a vacuum pressure less than or equal to 0.9 bar.

13. The device according to claim 1, further comprising:

a second optical fiber comprising a second thinned part, the second optical fiber being connected in series to a free end of the optical fiber.

14. A vacuum pressure measurement system, comprising:

a gauge placed in an enclosure in which a fluid circulates, said gauge comprising:

an optical fiber comprising a thinned part formed by a reduced transverse cross-sectional area of the optical fiber which functions to transfer heat from the reduced transverse cross-sectional area to a surrounding fluid;

a first laser configured to emit an optical wave into the thinned part in order to cause an increase in temperature in the thinned part of the optical fiber;

a sensor configured to measure a backscattered optical wave coming from a fluid surrounding the thinned part of the optical fiber; and a processing unit configured to trace back a pressure measurement via a determination of a temperature variation related to the backscattered optical wave.

15. A pressure measurement method comprising: emitting, using a first laser, an optical wave in a thinned heat transfer part of an optical fiber to cause an increase in temperature in the thinned heat transfer part of the optical fiber, the thinned part being formed by a reduced transverse cross-sectional area of the optical fiber which functions to transfer heat from the reduced transverse cross-sectional area to a surrounding fluid, measuring, using a sensor, a backscattered optical wave coming from a fluid surrounding the thinned heat transfer part of the optical fiber, and measuring tracing back, using a processing unit, a pressure measurement via a determination of a fluid surrounding the thinned part from the measurement of temperature variation related to the backscattered optical wave.

* * * * *